(12) United States Patent
Fischenberg (10) Patent No.: US 9,075,074 B2
(45) Date of Patent: Jul. 7, 2015

(54) FLOW DETERMINATION METHOD

(75) Inventor: Dietrich Fischenberg, Braunschweig (DE)

(73) Assignee: Deutches Zentrum fuer Luft- und Raumfahrt E.v., Cologne (DE)

( * ) Notice: Subject to any disclaimer, the term of this patent is extended or adjusted under 35 U.S.C. 154(b) by 195 days.

(21) Appl. No.: 13/131,988

(22) PCT Filed: Jul. 22, 2010

(86) PCT No.: PCT/EP2010/004496
§ 371 (c)(1),
(2), (4) Date: May 31, 2011

(87) PCT Pub. No.: WO2011/023270
PCT Pub. Date: Mar. 3, 2011

(65) Prior Publication Data
US 2011/0238330 A1  Sep. 29, 2011

(30) Foreign Application Priority Data

Aug. 28, 2009  (DE) .................. 10 2009 039 016

(51) Int. Cl.
*G01P 5/00* (2006.01)
*G01P 21/02* (2006.01)

(52) U.S. Cl.
CPC ............... *G01P 5/001* (2013.01); *G01P 21/025* (2013.01)

(58) Field of Classification Search
CPC ................................. G06F 19/00; G01F 1/00
USPC ...................................................... 702/45–50
See application file for complete search history.

(56) References Cited

U.S. PATENT DOCUMENTS

| | | |
|---|---|---|
| 5,845,874 A | 12/1998 | Beasley |
| 6,177,888 B1 | 1/2001 | Cabot et al. |
| 6,963,291 B2 | 11/2005 | Holforty et al. |
| 7,411,519 B1 | 8/2008 | Kuntman et al. |
| 2003/0222795 A1* | 12/2003 | Holforty et al. ............ 340/968 |
| 2005/0283323 A1* | 12/2005 | Anderson ................... 702/50 |

FOREIGN PATENT DOCUMENTS

| | | |
|---|---|---|
| DE | 43 20 295 | 4/1994 |
| DE | 103 16 762 A1 | 11/2001 |
| DE | 100 39 109 A1 | 2/2002 |
| DE | 10 2005 034 729 | 2/2007 |
| DE | 10 2007 051 318 | 4/2009 |
| DE | 10 2007 059 455 | 6/2009 |
| EP | 1 837 661 | 3/2006 |

* cited by examiner

*Primary Examiner* — Mischita Henson
(74) *Attorney, Agent, or Firm* — Whitham Curtis Christofferson & Cook, PC (57) ABSTRACT

The invention relates to a method for determining a flow, wherein flow velocities $\Delta V-LoS$ in measuring direction mr are measured by means of sensors 2 using at least one measuring position, comprising the following steps:

a) Initializing parameters of a flow model representing the flow, b) Calculating simulated flow velocities in the measuring direction at least at one measuring position according to the flow model representing the flow, c) Comparing the measured flow velocities to the simulated flow velocities and adjusting the parameters of the flow model that influences the flow by minimizing a quality function that depends on the comparison result, and d) Repeating of steps b) and c) and determining the flow in dependency of the approximated flow model.

9 Claims, 6 Drawing Sheets

FLOW DETERMINATION METHOD

FIELD OF THE INVENTION

The invention relates to a method for determining a flow, wherein flow velocities in measuring direction are measured by means of sensors using at least one measuring position. The invention also relates to a computer program with program code means and a device for this purpose.

BACKGROUND

A flow is a more or less directed movement of particles. In case of a desired flow this property is utilized in order to transport the particles over a distance with their directed movement. A flow may also be an unwanted side effect caused for instance by the fact that objects move relative to a medium.

For instance, in aviation it has been known for a long time that planes generate, as soon as their nose wheel is lifted from the ground, at the end of their wing tips air turbulence which is commonly known as wake turbulence. Wake turbulence is a vortical air flow behind a flying aircraft which consists of two contra-rotating air turbulences. Between these two vortex cores—which usually have a distance of three quarters of the wingspan of the aircraft—there are strong vertically descending air currents, while outside of the vortex cores there are strong upcurrents which can be very dangerous for successional aircrafts. An aircraft, which is, for instance, with one half of its wing between the downwash of the vortex cores and with its other half of the wing in the area of the upcurrent will get into a dangerous roll. Thus, for some aircraft accidents, the cause was seen in the fact that a following aircraft had gotten into the wake turbulence of a preceding aircraft and due to the strong vertical air movements finally crashed which in practice is the most common cause of incidents prior to landing.

This phenomenon of wake turbulence occurs especially during the landing of a large aircraft, thus, for safety reasons, after the landing of an aircraft it is required to wait a while until the same runway can be used again for air traffic. This safety measure is to ensure that aircrafts do not get into wake turbulence of a previously landed aircraft during take off or landing, and thus eventually crash. The effect duration of such wake turbulence depends on external environmental factors such as temperature, air pressure and wind direction and wind velocity. Until now the existence of such a wake turbulence can not be detected reliably; therefore a sufficient waiting time period (up to five minutes) is used for safety reasons after the landing of an aircraft till flight traffic is permitted again on this runway, regardless of whether the wake turbulence still exists or not. This does have a negative effect on the ultimate utilization of the airport.

In addition to the landing phase wake turbulences are also a problem at cruising levels. Due to the dense traffic resolution in air space it happens more and more frequently that a flying aircraft is getting into the trail of a preceding or higher flying aircraft (wake turbulences usually drop). Strong accelerations on board are usually the result which can result in injury to persons on board who are not wearing seat belts.

From a state of the art point of view a number of measures are known to avoid such wake turbulences. For instance, so-called winglets are used to reduce the turbulence of the air flow at the end of the wings. Winglets are mounted extensions at the end of the wings of aircrafts which are usually arranged basically vertical to the wing. For example, from DE 10 2007 059 455 A1, a wing tip extension is known which is to moderate the emergence of wake turbulence of such an aircraft.

SUMMARY

Therefore, the object of the invention, currently under consideration, is to identify flows or air flows reliably.

The task or problem is solved with the aforementioned method relating to the invention by use of the following steps:
a) Initializing parameters of a flow model representing the flow,
b) Calculating simulated flow velocities in the measuring direction at least at one measuring position according to the flow model representing the flow,
c) Comparing the measured flow velocities to the simulated flow velocities and adjusting the parameters of the flow model that influences the flow by minimizing a quality function that depends on the comparison result, and
d) Repeating of steps b) and c) and determining the flow in dependency of the approximated flow model.

Therefore, it is possible to determine very precisely flows such air flows of wake turbulences which significantly increases—for example—in applications of air traffic comfort and safety.

The sensors which measure the flow velocities in measuring direction, for instance, are LIDAR sensors which can determine the velocity of a flow exclusively in measuring direction. For instance with such a LIDAR sensor flow velocities of air flows could be measured by emitting a laser beam in measuring direction which is reflected by the respective airborne particulates. Due to the distance-velocity lag the velocity can be determined. However, with such only flow velocities in measuring direction can be determined, this is to say with such a systems and sensor one can—usually—not measure orthogonal to the measuring direction of flow velocities.

Flows, such as air flows, can usually be represented by so-called flow models in order to describe the behavior of a flow. For this purpose, the flows described by the flow model are characterized based on the parameters of the underlying flow model. According to the invention in step a) the parameters of the flow model will now be initialized.

In the next step (step b)) simulated flow velocities are calculated based on the in step a) initialized flow model at the measuring positions at which the flow velocities were measured by transferring of the real measuring positions into the flow model and by calculating at these measuring positions the flow velocities as described by the model.

In step c) now the measured flow velocities are compared with each other based on the measuring with the simulated flow velocities, and as calculated from the flow model, so that for instance the deferential generation shows how precise the flow model initialized with the parameters represents actually the real flow.

Due to the fact that the sensors can only determine the actual flow velocity in measuring direction the actual flow direction and flow velocity can not be derived from these sensors, because information is lacking regarding the direction of flow and flow velocity in the other two dimensions. For this reason, only the flow velocities are calculated with the simulated flow velocities as would be measurable in measuring direction if the flow model would 100% represent a respective flow. Thus, the simulated flow velocities, calculated from the flow model and the actual flow velocities, determined from the sensors, are compared with each other.

Using a quality function, for which the comparison result is used as a basis, the parameters of the flow model are now adjusted accordingly by minimizing the quality function. The quality function is a statistical method by which, adapted to the method currently under consideration, the parameters of the flow model can be optimized so as to minimize the difference between the actual flow velocities and calculated flow velocities.

In order to gradually improve the result, the invention currently under consideration suggests to repeat the steps b) and c) to approximate the parameters of the flow model more to the exact flow and then to determine the actual flow from the approximated flow model. In the iterative method currently under consideration the parameters of the flow model will be gradually adjusted until the flow model represents exactly the existing flow.

Thus, the flow to be determined, for instance, can be a wake turbulence flow generated by a flying object as already described in the introduction. Such a wake turbulence flow has the characteristic property that both vortices have very strong horizontal and vertical flow velocities while, however, the flow velocity is orthogonal to the wake level almost zero so that with assistance of sensors a flow velocity can be barely measured while being directly behind (i.e. in alignment) such wake turbulence.

Such a wake turbulence flow can usually be represented by an analytical vortex model such as an analytical vortex model based on Burnham-Hallock. This model does have as parameters the position of the wake turbulence and the vortex strength. Additionally, the orientation of the wake turbulence is needed, relative to the positions of objects detecting the wake turbulence to transform the real measured positions into the wake vortex model.

It is particularly advantageous if the flow velocities are determined and calculated based on time in such a way that within a certain period of time at discrete time points the flow velocities are determined by the sensors and the simulated flow velocities at these time points. In this way a respective velocity curve over time results at the particular measuring position which should be approximated based on the flow model with the method currently under consideration. For instance, the measuring position can be scanned at a frequency of 10 Hz so that 10 measurements per second are performed at the measuring position. This results in ten flow velocities per second.

It is particularly advantageous if several measurement positions, in particular four measurement positions, namely on all four outer edges of the measurement plane (thus the largest possible angular measurement angle is achieved) are scanned with the sensors and thus the actual flow velocities determined at these measured positions. This does result in a number of measuring positions—instead of those—the simulated flow velocities are calculated based on the flow model and which can be compared to the measured flow velocities.

Furthermore, it is particularly advantageous when the real flow velocities are measured continuously and thus the basis of the comparison continuously adapted to the current situation. The method according to steps a) to d) is performed only if the measured flow velocities at the measurement positions shows a significant deviation from the normal flow velocities which generally "drown" in the measurement noise. Only after a significant deviation compared to normal flow velocities the method as covered in steps a) through d) is performed.

Furthermore, it is also particularly advantageous if the iterative process is repeated until the difference undercuts the real and the simulated velocities approaching a corresponding threshold value. As the parameters of the flow model are adjusted in accordance to the quality function in each iteration step, the flow model approximates the actual flow in each run more and more. For instance, it was found that generally no more than ten iteration steps are needed to highly accurately approximate an appropriate wake vortex flow.

In addition, it is particularly advantageous if the parameters of the flow model in step a) are initialized be an object generating a flow. It is conceivable, for instance, in regards to the wake turbulence flow that an aircraft which wants to identify a wake turbulence flow receives flight data of a nearby aircraft and thus estimates where the wake turbulence flow might be located. However, since such wake turbulence flow changes relatively strongly—both in terms of position and in terms of strength—due to environmental influences, this information would usually not be sufficient to determine highly accurately the wake turbulence flow. To initialize the parameters of the method currently under consideration, however, this is sufficient, since, as a result of the repetition of this process step the wake turbulence flow is approximated with high precision.

BRIEF DESCRIPTION OF THE DRAWINGS

The method is illustrated exemplary in the accompanying drawings. The following is depicted.

DETAILED DESCRIPTION

The method currently under consideration is described in more detail based on an embodiment which relates to the detection of a wake turbulence of aircrafts. However, this should not be understood as limiting. Rather, the method can be applied to any other flows, where their velocities can be measured by sensors and where the flow can be represented using a flow model.

Figure 1A:
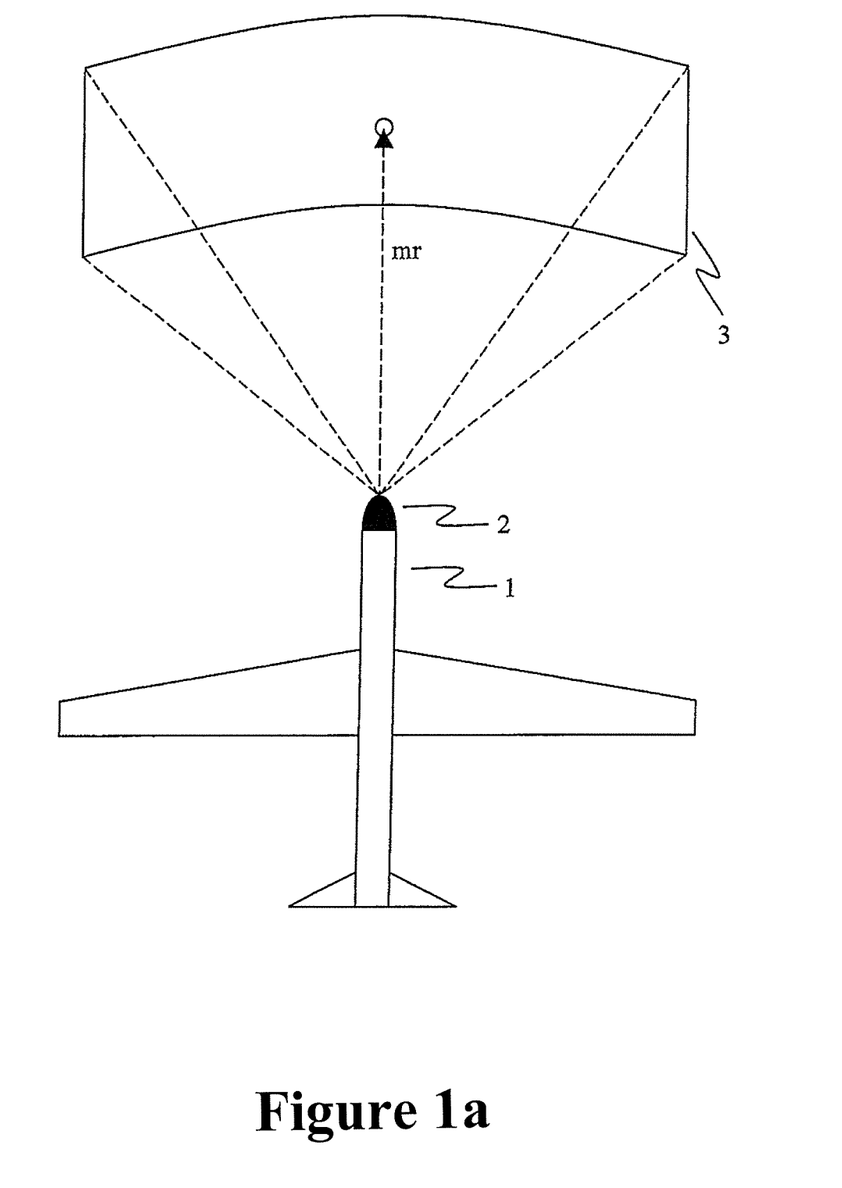
FIG. 1a, 1b—schematic representation of the measurement plane
FIG. 2—Flowchart of the method
FIG. 3—schematic representation of wake turbulence
FIG. 4a, 4b—schematic representation of the velocity measurement
FIG. 5 exemplary illustration of one measurement.

FIG. 1a shows the schematic diagram of the measuring principle. An aircraft 1 is equipped with sensors 2 on the nose which can detect using directional signals flow velocities in the direction of measurement. Such sensors 2 may be, for instance, Lidar sensors that emit a signal in the measuring direction which is then sent back by reflective particles. Hence, the flow velocity in the measuring direction can be determined.

As FIG. 1a shows a measurement plane 3 is spanned by scanning with the sensors 2 which can be—for instance—for the near field measuring of 50 m to 200 m in front of the plane 1 or for the distant field measurement from 1000 m up to 10000 m in front of the plane. The measuring direction mr is the direction in which the directional signal is emitted by the sensor 2 in the direction of the measurement plane 3. Thus, the flow velocities detected are based solely on velocities in depth of the measurement plane 3 so that flow velocities that are orthogonal to the measuring direction mr of the directed signal can not be detected by the system.

A near field measurement is particularly useful for the landing approach as wake turbulences can be detected with high precision during such and can be controlled with the flight control which is possible only with a highly accurate detection. However, the distant field measurement is important at high velocities in order to avoid the wake turbulence timely.

FIG. 1b shows again schematically the measuring plane 3 which has a total of 15 measuring positions 4.1 to 4.15. For each of these measurement positions 4.1 to 4.15 a directional signal is measured with the sensors 2. The sensors 2 measure at each measurement position 4.1 to 4.15 the flow velocities in the so-called line-of-Sight (LoS) direction; each measuring position 4.1 to 4.15 is defined by the distance, and by the vertical and horizontal angle. Thus, in the LoS coordinate system each measurement position 4.1 to 4:15 is determined by the distance of sensors 2 to the measuring point and the corresponding angle in horizontal and vertical plane.

Figure 1B:
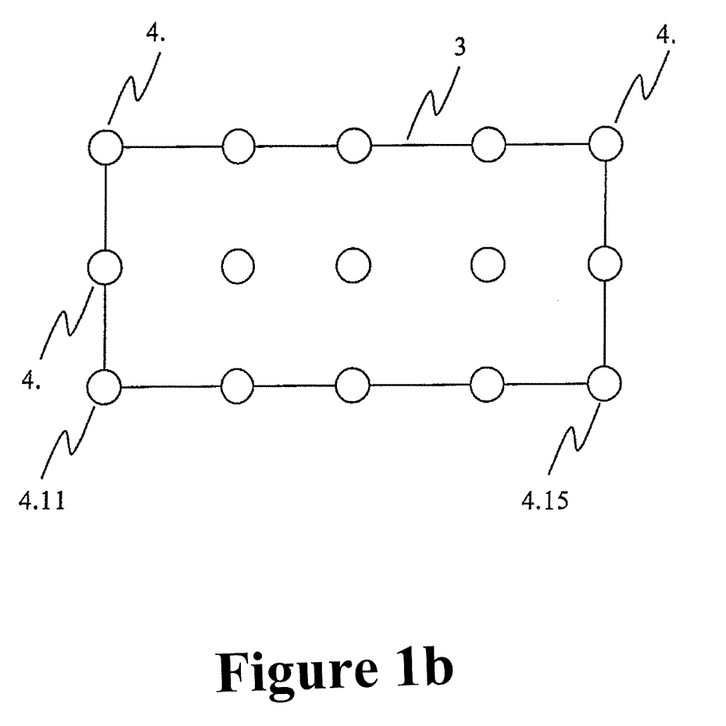

For instance, measuring position 4.5 in FIG. 1b is at a vertical angle of 10° and a horizontal angle of 20° and in near field at a distance of 150 m from sensors 2.

The total pulse rate of today's LIDAR systems is in the range of 500-1000 Hz which equals to an update rate of the entire measuring field of 10 Hz, and approximately 50-100 measurement positions.

Figure 2:
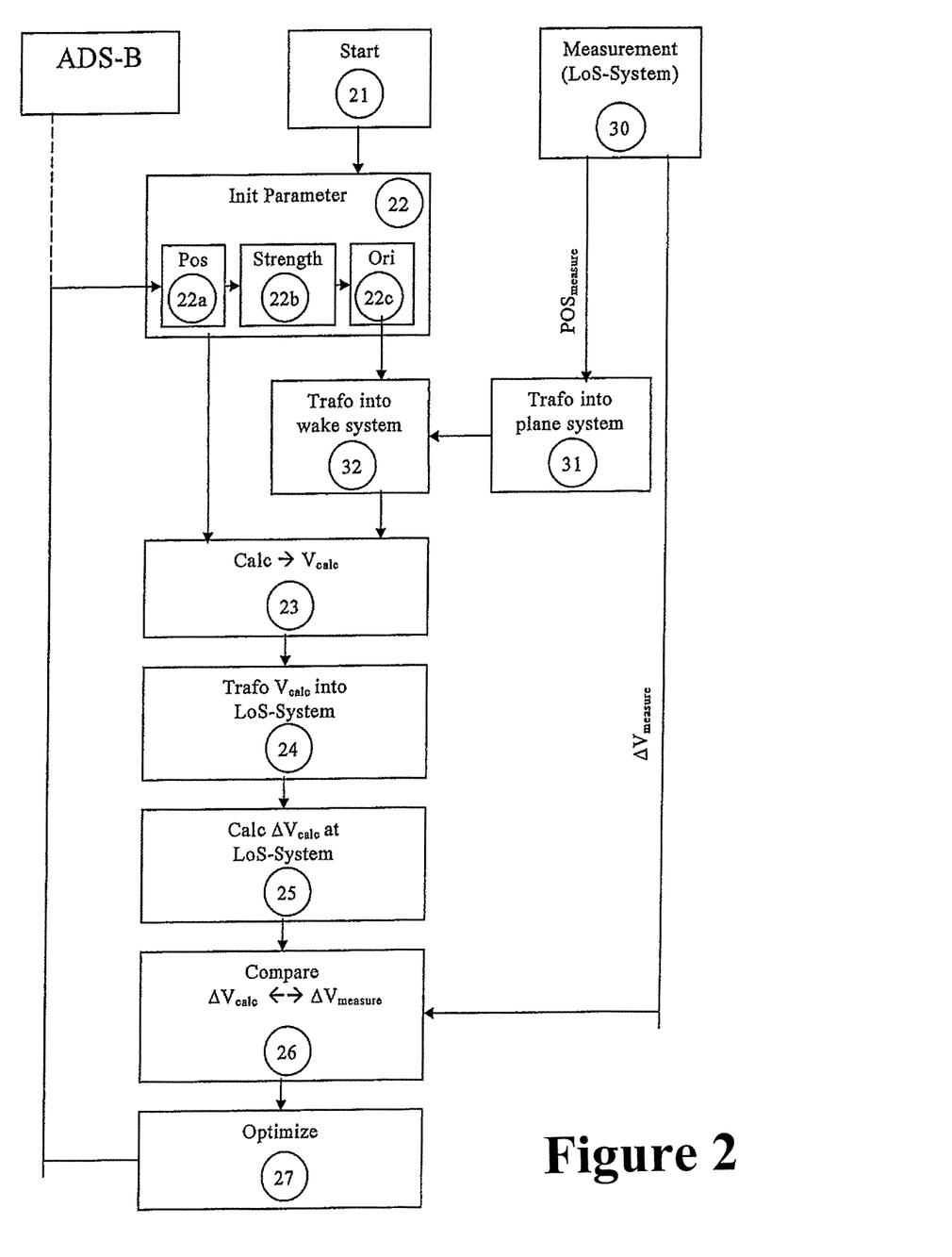

FIG. 2 shows schematically the sequence of the method currently under consideration. The method begins with the vertex 21. Firstly, at point 22 the parameters of the underlying flow model will be initialized. This can be done, for instance, in that another aircraft—from which the wake turbulence is to be detected—and which is nearby of aircraft 1 sends its data via the ADS-B system, and therefore, one can approximately predict where wake turbulence might be located. In other words, from the safety system, ADS-B (Automatic Dependent Surveillance-Broadcast), the parameters of such wake turbulence will be approximately determined based on the airplane data from another aircraft. However, wake turbulences—due their instability—are heavily influenced by external environmental factors such as wind and air pressure, thus, they vary greatly shortly after their generation, so that the ADS-B system is not generally suitable to determine such a wake turbulence with high accuracy from airplane data from the wake turbulence generating aircraft.

After the parameters of the flow model were initialized in step 22, the measurement positions 23 are required within the flow model as next step. The measured positions of 4.1 through 4.15, as described in FIG. 1b, are the positions at measurement plane 3 which were scanned by an appropriately directed signal from a sensor. This measurement of flow velocities at the measurement positions 4.1 to 4.15 occurs in step 30 parallel to the actual method. The positions of these measurement points 4.1 to 4.15 are in the so-called LoS system, i.e. their position is determined by the measuring distance and the horizontal and vertical angle.

In a subsequent step, the coordinates of the measurement positions 4.1 to 4.15 are converted into a geodetic coordinate system, whereby the two sensors on the aircraft 1 are the origin of this coordinate system. The conversion is performed by the following angular correlations:

$$x_{Sensor,geo} = x_{mess} \cos \psi_{Sensor} \cos \Phi_{Sensor}$$

$$y_{Sensor,geo} = x_{mess} \sin \psi_{Sensor} \cos \Phi_{Sensor}$$

$$z_{Sensor,geo} = x_{mess} \sin \psi_{Sensor},$$

whereby $x_{Sensor,geo}$, $y_{Sensor,geo}$ and $z_{Sensor,geo}$ is the coordinate of the analogical measuring position in the geodetic coordinate system with origin of sensors 2, $x_{mess}$ the measuring distance (for instance 150 m) and $\psi_{Sensor}$ (Psi) the horizontal angle and $\Phi_{Sensor}$ (Phi) the vertical angle. This conversion takes place in step 31.

In this embodiment, the underlying flow model is a flow model after Burnham-Hallock which among other parameters uses the orientation or alignment of the wake turbulence. This orientation is defined relative to the wake vortex detecting aircraft as angle. Now, in order to determine at the measurement positions 4.1 to 4.15 the flow velocities from the flow model the coordinates of the measured positions—which were converted in step 31 into a geodetic coordinate system with origin from the sensors 2—must be converted into the coordinate system of the wake turbulence. This is done as well with the corresponding angular correlations as follows:

$$x_{ws} = x_{Sensor,geo} \cos \psi_{wake} + y_{Sensor,geo} \sin \psi_{wake}$$

$$y_{ws} = -x_{Sensor,geo} \sin \psi_{wake} + y_{Sensor,geo} \cos \psi_{wake}$$

$$z_{ws} = z_{Sensor,geo}$$

where $x_{ws}$ and $y_{ws}$ is the coordinate of the measuring position in the system of coordinates of the vortex (ws) and $\psi_{wake}$ is the horizontal angle between the wake vortex and the aircraft. Optionally these formulas can be expanded corresponding to the vertical angle of rotation $\psi_{wake}$. This transformation of the measured positions from the geodetic coordinate system to the geodetic vortex system of coordinates takes place in step 32.

Now, the flow velocities at these positions from the flow model will be detected in step 23 at the measurement positions in the system of coordinates of the vortex from step 32. For that purpose, step 23 has as input the transformed measurement positions in the system of coordinates of the vortex from step 32 as well as the parameters of the flow model which were initialized in step 22. Now, the respective flow velocity is determined at all measuring points.

Figure 3:
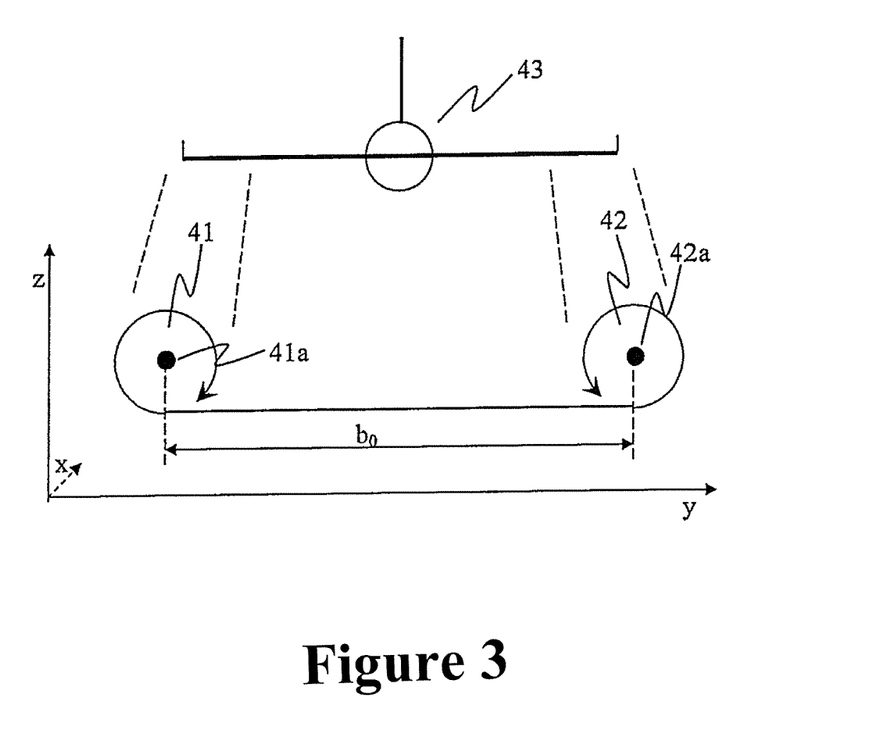

After the flow velocities have been determined at the measurement points these flow velocities could serve as input into the aircraft control, for instance, to control the wake turbulence and possibly to increase safety and comfort when flying through such wake turbulence.

in the vortex system plane y, z, as shown, for instance, in FIG. 3, the distance r of a point is calculated from the right side ($y_{ri}$, $z_{ri}$) or left side vortex core ($y_{li}$, $z_{li}$) at each measuring position as follows:

$$r_{ri} = \sqrt{(y_{ws} - y_{ri})^2 + (z_{ws} - z_{ri})^2}$$

$$r_{le} = \sqrt{(y_{ws} - y_{le})^2 + (z_{ws} - z_{ri})^2}$$

whereby $y_{ws}$ and $z_{ws}$ represent the horizontal and vertical position of the measuring position so that $r_{ri}$ and $r_{le}$ for each measuring position represent the distance from the respective vortex cores.

In order to calculate the velocities at these positions these distances are entered in the flow model of Burnham-Hallock, and the velocities calculated as follows:

$$V_t(r_{ri}) = \frac{\Gamma}{2\pi} \frac{r_{ri}}{r_c^2 + r_{ri}^2}$$

$$V_t(r_{le}) = \frac{\Gamma}{2\pi} \frac{r_{le}}{r_c^2 + r_{le}^2}$$

whereby $r_c$ is the core radius, which is preset with 4% of the wing spread and $\Gamma$ represents the energy of the vortex. With The formula $$V_y = V_t(r_{ri}) \left( \frac{z - z_{ri}}{r_{ri}} \right) - V_t(r_{le}) \left( \frac{z - z_{le}}{r_{le}} \right)$$

$$V_z = V_t(r_{ri}) \left( \frac{y - y_{ri}}{r_{ri}} \right) - V_t(r_{le}) \left( \frac{y - y_{le}}{r_{le}} \right)$$

now, the velocities at these points in their horizontal component ($V_y$) and their vertical component ($V_z$) in the system of coordinates of the vortex are split, whereby x-component of the vortex in the system of coordinates of the vortex are set to 0 ($V_x=0$).

Thus results at each measuring position which has been identified in the system of coordinates of the vortex the corresponding velocity from the flow model of the wake turbulence.

In order to compare the calculated flow velocities with the measured flow velocities at all the calculated flow velocities which are now available in horizontal and vertical components are converted back to the LoS system of the sensors. This is required as sensors 2 only determine the flow velocities in the direction of measurement and therefore only can determine a flow velocity difference ($\Delta V$–LoS) since the individual velocity components can not be split. Therefore, the calculated flow velocities which are still available in the respective horizontal and vertical components are transformed back into the LoS system, which takes place in step 24. This is done using the following formula:

$$V_{x\cdot geo} = V_x \cos\psi_{wake} - V_y \sin\psi_{wake}$$

$$V_{y\cdot geo} = V_x \cos\psi_{wake} - V_y \cos\psi_{wake}$$

$$V_{z\cdot geo} = V_z$$

now, the velocities are available in the geodetic coordinate system and are converted into the LoS system with the formula (only x-component)

$$V_{x,LOS} V_{x,geo} \cos\psi_{LIDAR} \cos\Theta_{LIDAR} + V_{y,geo} \cos\psi_{LIDAR} \cos\Theta_{LIDAR} - V_{z,geo} \cos\Theta_{LIDAR}$$

This is done in step 25.

Now that the calculated flow velocities were re-calculated back into the LoS system of the sensors and with the result of a calculated or simulated $\Delta V$–LoS these measured flow velocities in the direction of measurement and the calculated flow velocities in measuring direction can be compared and—for instance—differences can be determined. This is done in step 26. The greater the difference, the less accurate the representation of flow or wake turbulence based on the parameters of the flow model. Therefore, the parameters of the flow model can now be adjusted according to the comparison, which may, for instance, be done with an appropriate optimization function. Such optimization functions are sufficiently known from the state of the art, for instance, by minimizing of an appropriate quality function which receives as input parameters the comparison result of step 26.

In dependency of this quality function which is minimized in step 27 the parameters of the flow model are adjusted and the method is repeated in step 22. Repeating the method can take place until the difference, which is determined in step 26, does not exceed a corresponding threshold value, so that the parameters of the flow model sufficiently approximate the actual flow.

It was found that generally no more than ten iteration steps are needed to highly accurately approximate wake turbulence and to identify it so precisely that this data finds input into the flight control system of an aircraft.

FIG. 3 shows again an example of such wake turbulence in the system of coordinates of the vortex. In the vortex planes y, z, the two vortex cores 41 and 42 rotate in opposite directions. The velocities that occur there are usually only contained in the vortex plane y, z. Velocities in the depth, i.e. in x-direction hardly occur.

Each of the vortex cores 41, 42 has a vortex center 41a, 42a, around which the two vortexes rotate. The distance $b_0$ of these two vortex cores 41a, 42a from each other is assumed to be ¾ of the wingspan of a vortex generating aircraft 43.

Figure 4A:
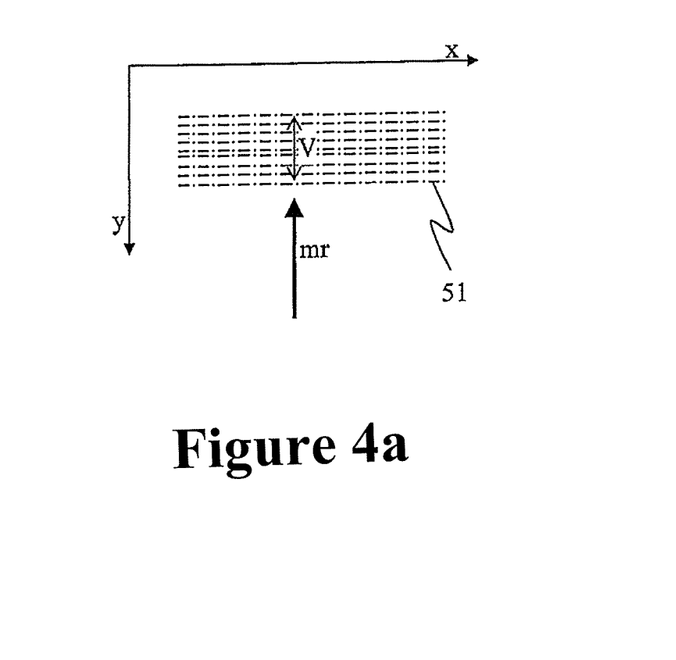
Figure 4B:
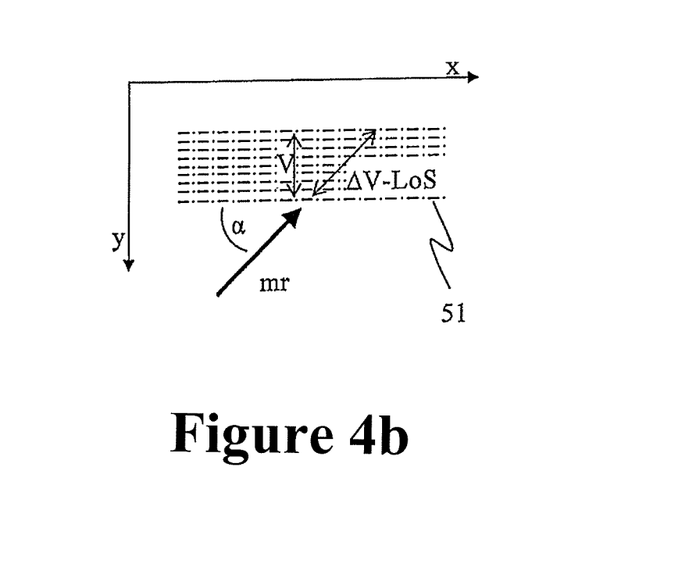

The FIGS. 4a and 4b schematically show again the problem with the so-called LoS measurement using Lidar sensors which send out directed signals for velocity detection. In FIG. 4a is the wake turbulence 51 at right angle to the direction of measurement mr. The velocity V is determined here only in the y-direction by means of the Lidar sensor. However, a z-component of the velocity and an x-component is not measurable.

FIG. 4b shows the same wake turbulence 51, but with the difference that the direction of measurement mr meets at an angle α wake turbulence flow 51. The true velocity V and the y-direction is not measurable in this case, only the so-called $\Delta V$. From the angular relationship $$V_y = \frac{\Delta V}{\sin\alpha}$$

however, the actual velocity in y-direction can be back-calculated.

However, it is important that the angle α is known. If the angle α is only approximately known the result will be different flow velocities which are no longer 100% correct.

Figure 5:
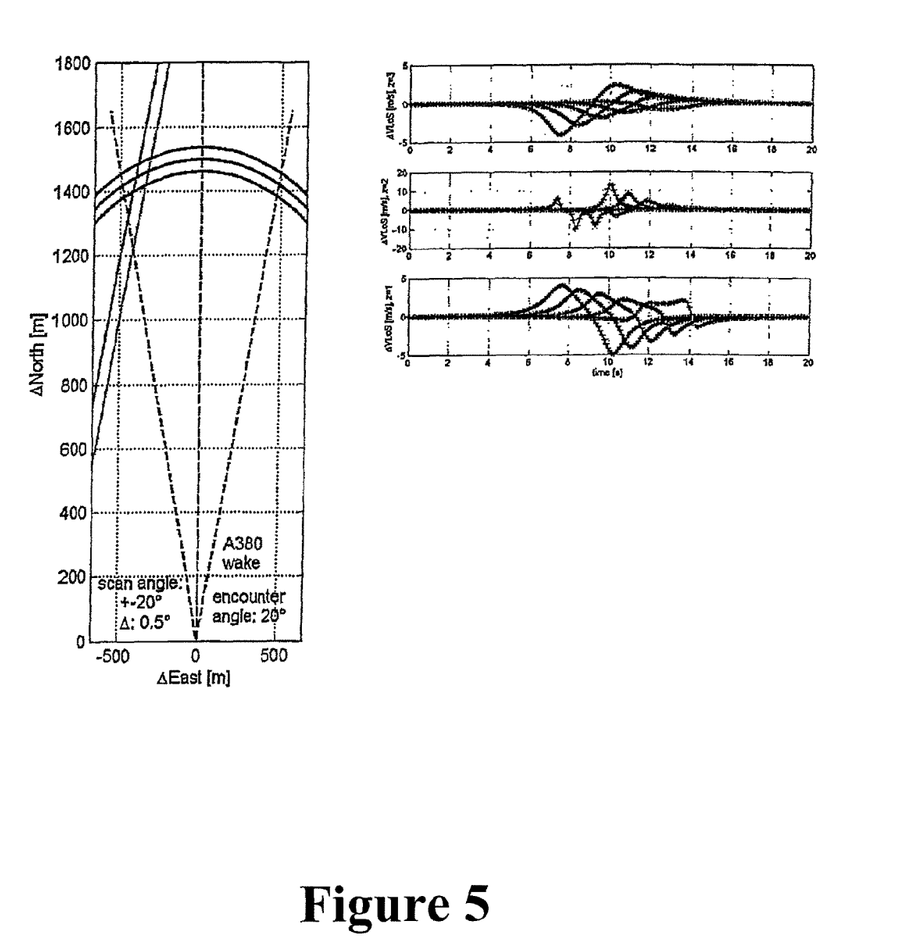

FIG. 5 shows the result of a LoS measurement, as shown in the left area, were in three lines per line five measurement positions were measured. The right diagram shows for each line for each of the five measured positions the result of measuring the flow velocity over time. For this purpose a horizontal approach angle of 20° is assumed as well as a rate of 10 Hz. In 20 seconds this makes 200 measurements for each measuring point as shown in the graphic. It can be seen that there are for each measuring point different flow velocities, whereby these flow velocities can only be determined in the direction of measurement ($\Delta V$–LoS).

The invention claimed is:

1. A method for determining a flow in a vicinity of a first aircraft comprising the following steps:
   measuring one or more flow velocities by one or more sensors on the first aircraft using at least one measuring position of the one or more sensors, each of the one more measured flow velocities being in one measuring direction of the one or more sensors;
   initializing parameters of a flow model representing a flow, wherein the flow is a wake turbulence of a second aircraft and the flow model is an analytical vortex model;
   calculating, with an arithmetic unit connected with the one or more sensors, one or more simulated flow velocities at the at least one measuring position according to the flow model representing the flow;
   comparing with the arithmetic unit the one or more measured flow velocities obtained from said measuring step to the one or more simulated flow velocities obtained from said calculating step;
   adjusting the parameters of the flow model representing the flow by minimizing a quality function that depends on at least one comparison result of said comparing step to obtain an approximated flow model;
   repeating said steps of calculating, comparing, and adjusting for one or more iterations; and then
   determining the flow of the second aircraft in dependency of the approximated flow model.

2. The method of claim 1, wherein the step of measuring is performed within a period of discrete time points, and wherein said calculating step calculates the one or more simulated flow velocities at said discrete time points.

3. The method of claim 1, wherein the step of measuring is performed at multiple measuring positions and wherein said calculating step calculates the one or more simulated flow velocities at each of the multiple measuring positions.

4. The method of claim 1, wherein the step of measuring is performed continuously.

5. The method of claim 1, wherein said repeating step repeats until a difference between the one or more measured flow velocities and the one or more simulated flow velocities does not exceed a threshold value.

6. The method of claim 1, wherein the parameters of the flow model include an orientation, a position, and a strength of the wake turbulence.

7. The method of claim 1, wherein said initializing step initializes the parameters of the flow model in accordance with flight data of the aircraft.

8. A non-transitory computer readable medium encoded with a computer program for executing the following steps on a data processing system:
- initializing parameters of a flow model representing a flow, wherein the flow is a wake turbulence of a second aircraft and the flow model is an analytical vortex model;
- calculating one or more simulated flow velocities at at least one measuring position according to the flow model representing the flow;
- comparing one or more measured flow velocities from one or more sensors on a first aircraft to the one or more simulated flow velocities obtained from said calculating step, each of the one more measured flow velocities being in one measuring direction;
- adjusting the parameters of the flow model representing the flow by minimizing a quality function that depends on at least one comparison result of said comparing step to obtain an approximated flow model;
- repeating said steps of calculating, comparing, and adjusting for one or more iterations; and
- determining the flow of the second aircraft in dependency of the approximated flow model.

9. A device for determining a flow, comprising:
one or more sensors on a first aircraft which measure flow velocities using at least one measuring position of the one or more sensors, each of the one more measured flow velocities being in one measuring direction of the one or more sensors; and
an arithmetic unit connected with the one or more sensors which implements the following steps:
- initializing parameters of a flow model representing a flow, wherein the flow is a wake turbulence of a second aircraft and the flow model is an analytical vortex model;
- calculating one or more simulated flow velocities at the at least one measuring position according to the flow model representing the flow;
- comparing the one or more measured flow velocities obtained from said one or more sensors to the one or more simulated flow velocities obtained from said calculating step;
- adjusting the parameters of the flow model representing the flow by minimizing a quality function that depends on at least one comparison result of said comparing step to obtain an approximated flow model;
- repeating said steps of calculating, comparing, and adjusting for one or more iterations; and
- determining the flow of the second aircraft in dependency of the approximated flow model.

* * * * *